United States Patent
Lundblade et al.

(10) Patent No.: US 9,654,978 B2
(45) Date of Patent: May 16, 2017

(54) ASSET ACCESSIBILITY WITH CONTINUOUS AUTHENTICATION FOR MOBILE DEVICES

(71) Applicant: QUALCOMM Incorporated, San Diego, CA (US)

(72) Inventors: Laurence Lundblade, San Diego, CA (US); Mark Bapst, South Barrington, IL (US); George Michael Milikich, Round Rock, TX (US); Jon Azen, San Diego, CA (US); Ian Brettell, San Diego, CA (US); Eliza Yingzi Du, Cupertino, CA (US); Jonathan Griffiths, Fremont, CA (US); Suryaprakash Ganti, Los Altos, CA (US); Samir Gupta, San Diego, CA (US); David William Burns, San Jose, CA (US); Muhammed Ibrahim Sezan, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/681,972

(22) Filed: Apr. 8, 2015

(65) Prior Publication Data
US 2016/0227411 A1    Aug. 4, 2016

Related U.S. Application Data

(60) Provisional application No. 62/111,574, filed on Feb. 3, 2015.

(51) Int. Cl.
*H04W 12/08*      (2009.01)
*G06F 21/32*      (2013.01)
*G06F 21/31*      (2013.01)

(52) U.S. Cl.
CPC ............ *H04W 12/08* (2013.01); *G06F 21/31* (2013.01); *G06F 21/32* (2013.01); *G06F 2221/2111* (2013.01); *G06F 2221/2149* (2013.01)

(58) Field of Classification Search
CPC ....... H04W 12/08; H04W 12/06; G06F 21/32; G06F 21/31; G06F 2221/2111; G06F 2221/2149
See application file for complete search history.

(56) References Cited

U.S. PATENT DOCUMENTS 8,839,358 B2 *   9/2014  Strauss ................. G06F 21/31
                                                382/118
8,892,461 B2    11/2014  Lau et al.
9,148,435 B2 *   9/2015  Hoyos .................. H04L 63/105
(Continued)

OTHER PUBLICATIONS

International Search Report and Written Opinion—PCT/US2016/012743—ISA/EPO—Apr. 15, 2016.

*Primary Examiner* — Brandon Miller
(74) *Attorney, Agent, or Firm* — Won Tae C. Kim

(57) ABSTRACT

A mobile device may include a plurality of sensors and a processor. The processor may be configured to determine trust data for an asset based upon inputs from the plurality of sensors, determine whether an asset is accessible or not accessible based upon evaluating the trust data with a trust determination algorithm, and continuously update the trust data to continue to allow access to the asset or revoke access to the asset based upon the inputs from the plurality of sensors.

25 Claims, 5 Drawing Sheets

(56) References Cited

U.S. PATENT DOCUMENTS

| | | | |
|---|---|---|---|
| 2010/0056105 A1* | 3/2010 | Erhart | G06F 21/629 |
| | | | 455/411 |
| 2010/0192209 A1 | 7/2010 | Steeves et al. | |
| 2012/0167170 A1 | 6/2012 | Shi et al. | |
| 2014/0115707 A1 | 4/2014 | Bailey, Jr. | |
| 2014/0157401 A1 | 6/2014 | Alameh et al. | |
| 2014/0282868 A1 | 9/2014 | Sheller et al. | |
| 2014/0366111 A1 | 12/2014 | Sheller et al. | |
| 2015/0135021 A1* | 5/2015 | Robison | G06F 21/6263 |
| | | | 714/55 |
| 2015/0135298 A1* | 5/2015 | Robison | G06F 21/31 |
| | | | 726/10 |

* cited by examiner

ASSET ACCESSIBILITY WITH CONTINUOUS AUTHENTICATION FOR MOBILE DEVICES

CROSS REFERENCE TO RELATED APPLICATIONS

The present application claims priority to U.S. Provisional Patent Application No. 62/111,574, filed Feb. 3, 2015, entitled "Mobile Device to Continuously Update the Status of Asset Based upon Sensor Inputs," the content of which is hereby incorporated by reference in its entirety for all purposes.

BACKGROUND

Field

The present invention relates to a mobile device that provides enhanced security by continuously monitoring whether the correct user is accessing an asset.

Relevant Background

Mobile devices may be lost or stolen very easily due to their mobile nature. Today, the main defense available to protect the data of the mobile device is a timeout/lock screen feature. Unfortunately, many people do not use the timeout/lock screen feature because of its inconvenience. Further, the timeout/lock screen feature is not an ideal security mechanism because it leaves a window of opportunity for a thief to acquire data from the mobile device.

Additionally, in today's mobile world, relying parties (e.g. websites, enterprises, etc.) are now beginning to require the authentication of the individual actually using the mobile device. Today, that is typically achieved by a password, a PIN, or a fingerprint. Unfortunately, there is still a window of opportunity for a thief after the password, PIN, or fingerprint is entered to acquire data and/or access relying parties. Moreover, at the same time, today's frequent requirements for the user to continuously manually authenticate themself via PIN, password, or fingerprint entry negatively intrudes upon the user experience.

SUMMARY

Aspects may relate a mobile device that provides enhanced security by continuously monitoring whether the correct user is accessing an asset. A mobile device may include a plurality of sensors and a processor. The processor may be configured to determine trust data for an asset based upon inputs from the plurality of sensors, determine whether an asset is accessible or not accessible based upon evaluating the trust data with a trust determination algorithm, and continuously update the trust data to continue to allow access to the asset or revoke access to the asset based upon the inputs from the plurality of sensors.

BRIEF DESCRIPTION OF THE DRAWINGS

FIG. 5 is a diagram illustrating unlocked, suspicious, and locked states that the mobile device may cycle through.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablet computers, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, mobile health devices, smart wearable devices, or any computing device or data processing apparatus.

Figure 1:
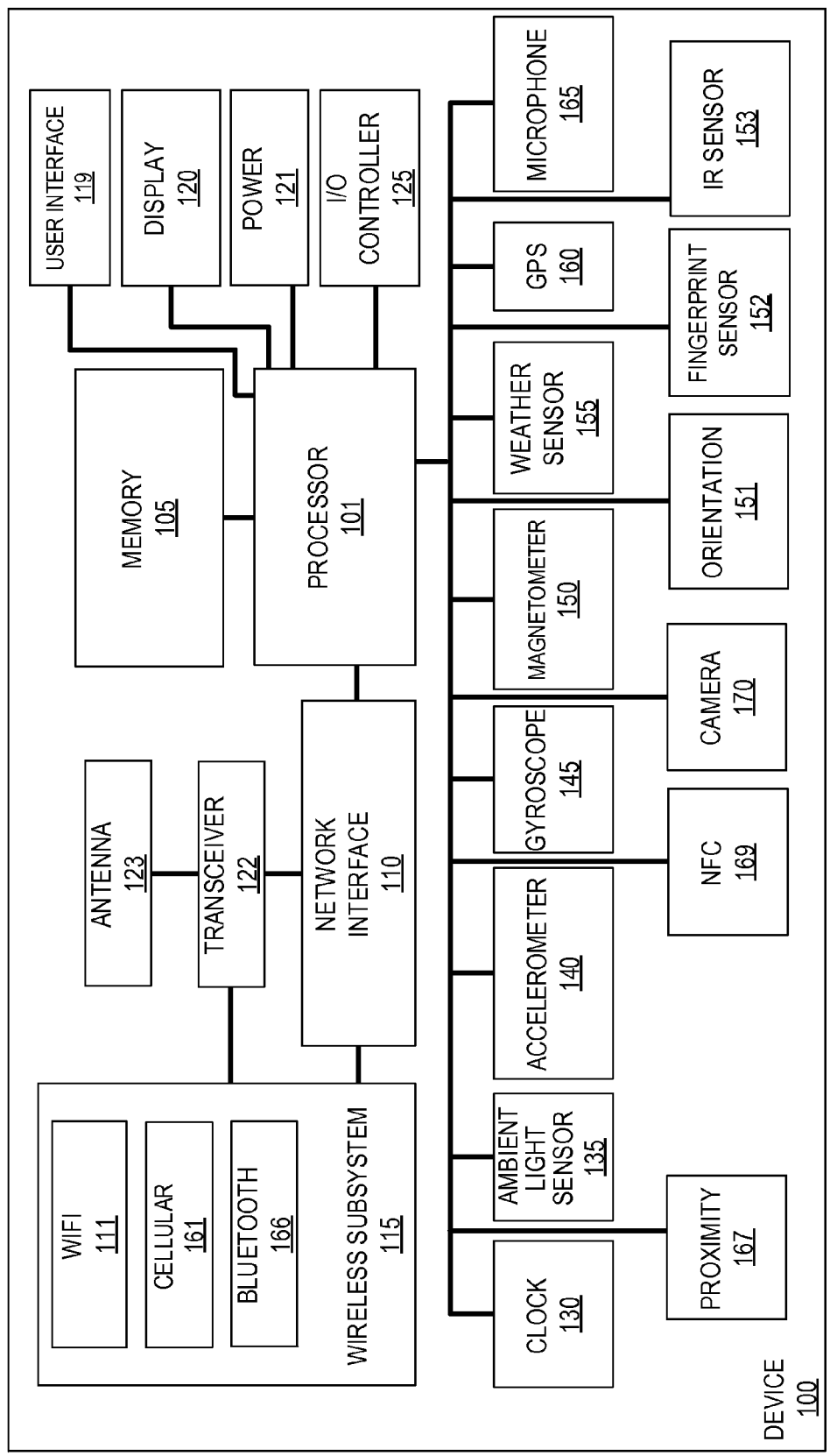
FIG. 1 is a diagram of a device in which aspects of the invention may be practiced.

FIG. 1 is a block diagram illustrating an exemplary device in which embodiments of the invention may be practiced. The system may be a computing device (e.g., a mobile device 100), which may include one or more processors 101, a memory 105, I/O controller 125, and network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include sensors such as a clock 130, ambient light sensor (ALS) 135, accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors/devices may include a microphone 165 and camera 170. Communication components may include a wireless subsystem 115 (e.g., Bluetooth 166, Wi-Fi 111 or cellular 161), which may also be considered sensors that are used to analyze the environment (e.g., position) of the device. In some embodiments, multiple cameras are integrated or accessible to the device. For example, a mobile device may have at least a front and rear mounted camera. The cameras may have still or video capturing capability. In some embodiments, other sensors may also have multiple installations or versions.

Memory 105 may be coupled to processor 101 to store instructions for execution by processor 101. In some embodiments, memory 105 is non-transitory. Memory 105 may also store one or more models, modules, or engines to implement embodiments described below that are implemented by processor 101 including a collection engine and a policy engine. Memory 105 may also store data from integrated or external sensors.

Mobile device 100 may include one or more antenna(s) 123 and a transceiver 122. The transceiver 122 may be configured to communicate bidirectionally, via the antenna(s) and/or one or more wired or wireless links, with one or more networks, in cooperation with network interface 110 and wireless subsystems 115. Network interface 110 may be coupled to a number of wireless subsystems 115 (e.g., Bluetooth 166, Wi-Fi 111, cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from wireless access points (WAPs), and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band (UWB), ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Device 100 may be a mobile device, wireless device, cellular phone, personal digital assistant, mobile computer, wearable device (e.g., head mounted display, wrist watch, virtual reality glasses, etc.), internet appliance, gaming console, digital video recorder, e-reader, robot navigation system, tablet computer, personal computer, laptop computer, or any type of device that has processing capabilities. As used herein, a mobile device may be any portable or movable device or machine that is configurable to acquire wireless signals transmitted from and transmit wireless signals to one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments of the invention as will be hereinafter described may be implemented through the execution of instructions, for example as stored in the memory 105 or other element, by processor 101 of mobile device 100 and/or other circuitry of device 100 and/or other devices. Particularly, circuitry of the device 100, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Embodiments of the invention may relate to obtaining authentication information from the mobile device 100, in the background, without intruding into the user experience, such that the user does not have to constantly authenticate themself. As will be described, many types of background information may be taken periodically, in the background, such that the user can be constantly authenticated, without requiring specific user input from the user themself. As an example, camera 170 may periodically obtain a photo of the user's face, and processor 101 may implement a facial recognition routine to authenticate the user. Additionally, as will be described in more detail hereinafter, embodiments of the invention may utilize contextual information, such as light level, location, kind of motion, sound level, and/or other contextual information, in order to determine if the mobile device 100 has been stolen or is otherwise not in a normal environment. Contextual information may refer to the environment, at which the mobile device 100 is currently in, such as location, motion, light, sound, that does not require explicit input from the user.

Embodiments of the invention may relate to protecting the assets of a mobile device 100. The protection of assets for mobile devices is significant because mobile devices, due to their mobility, may be easily lost or stolen. Example of assets may include: the mobile device itself, the ability to make a voice call; local user data (e.g., specific files of company confidential information), personal data files (e.g., photos, movies, address book, etc.); email access; authentication material to network resources; access to remote data; high value content that the user may have paid for and downloaded; etc. Aspects of the invention may relate to providing different levels of protection for different assets. For example, an address book may be selected as one asset that requires stronger protection than access to another asset, such as photos. By applying this sort of granularity, in a mobile device 100, a mobile device may have tens, hundreds, or even thousands of assets. Moreover, as will be described, according to embodiments of the invention, each particular asset may be determined to be accessible or not accessible.

In one embodiment, many types of sensor inputs of the mobile device 100 may be utilized in determining whether an asset is accessible or not accessible. Example sensor inputs may include a fingerprint sensor 152 to obtain a fingerprint, a microphone 165 to obtain a voice print, or contextual sensors such as weather sensor 155, accelerometer 140, GPS 160, etc. In aspects to be hereinafter described, these different types of sensors and inputs may be used to control access to many different types of defined assets on the mobile device 100. In particular, this may be done in the background, in a continuous manner, to minimize authentication steps that explicitly require the user to enter authentication input to access assets.

Figure 2:
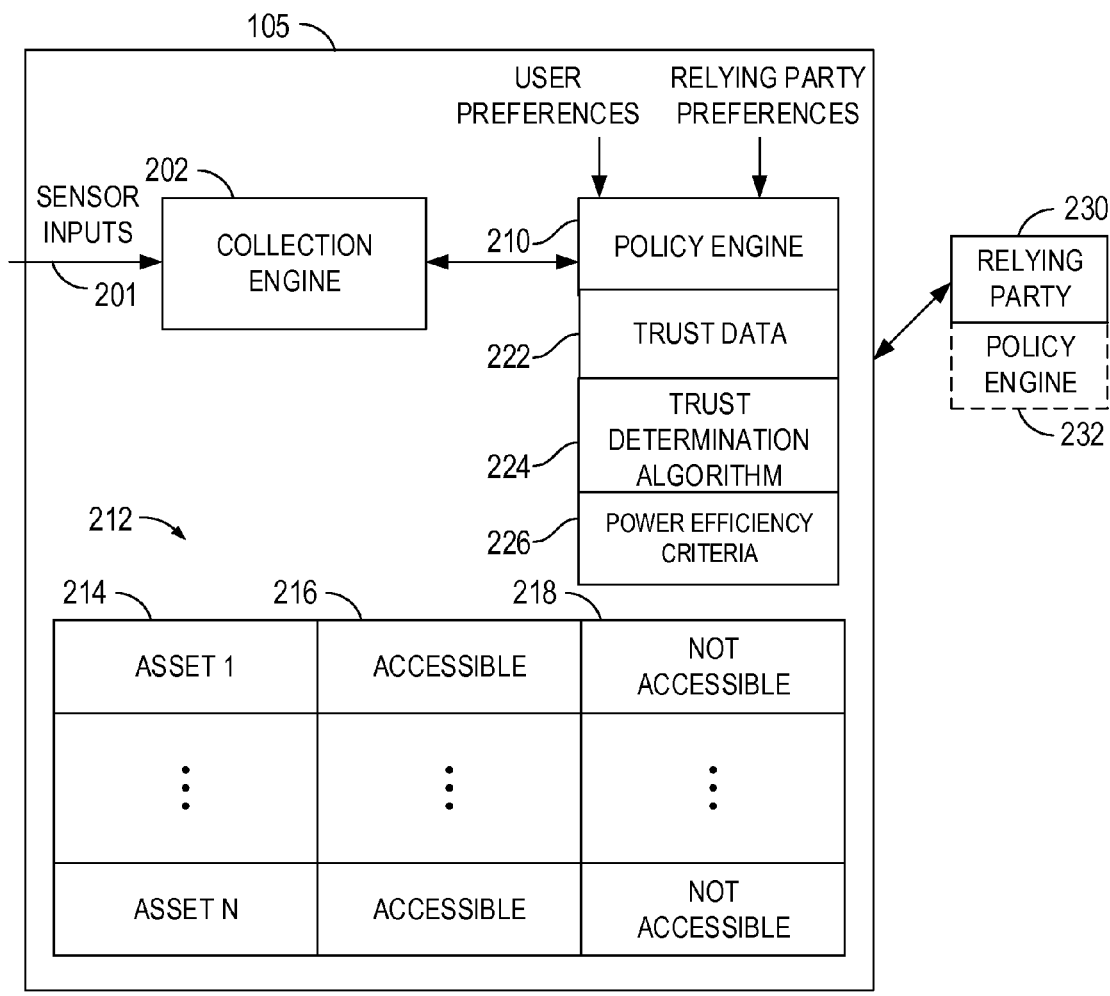
FIG. 2 is a diagram of a policy engine that is configured to implement a plurality of functions to determine whether an asset should be accessible or not accessible.

With additional reference to FIG. 2, processor 101 of mobile device 100 may be configured to implement a plurality of functions to determine whether an asset should be accessible or not accessible. In particular, processor 101 based upon sensor inputs 201 (e.g., from the previously-described sensors) may implement a collection engine 202 to collect all of the sensor input data 201 and a policy engine 210 to determine whether an asset should be accessible or not accessible. Policy engine 210 may determine the accessibility or non-accessibility of an asset based upon user preferences and/or relying party preferences, as will be further described hereinafter. It should be appreciated that user preferences may be preferences assigned to the mobile device by a management authority (e.g., a company may assign a mobile device management (MDM) policy to an employee's mobile device to dictate trust level or trust determination requirements).

In one embodiment, processor 101 is configured to: determine trust data for an asset based upon inputs from the plurality of sensors; determine whether an asset is accessible or not accessible based upon evaluating the trust data with a trust determination algorithm; and continuously update the trust data to continue to allow access to the asset or revoke access to the asset based upon the inputs from the plurality of sensors.

In one embodiment, processor 101 implements policy engine 210 that is configured to: determine trust data 222 for an asset 214 based upon sensor inputs 201 collected by the collection engine 202; determine whether an asset 214 is accessible or not accessible based upon evaluating the trust data 222 with a trust determination algorithm 224; and continuously update the trust data 222 to continue to allow access to the asset 224 or revoke access to the asset 224 based upon sensor inputs 201 from the plurality of sensors.

The trust determination algorithm 224 may be a simple polynomial calculation, a complex formula, Boolean logic, or a full algorithm implemented in firmware or software, or combinations thereof, that operate over all of the various authentication states of the mobile device, based upon sensor input data and contextual input data, examples of which will be hereinafter described. As will be described, the trust determination algorithm 224 operates based upon the authentication state which may be composed of many variables and sets of rules. The trust determination algorithm 224 may continuously monitor the authentication state to determine asset accessibility. Examples of this will be described in more detail hereinafter. In one embodiment, the trust determination algorithm calculates whether the asset is accessible or not accessible. For example, the trust determination algorithm may calculate a yes value (e.g., 1) that the asset is accessible or a no value (e.g., 0) that the asset is not accessible.

As an example, under the control of policy engine 210, processor 101 may monitor a plurality of differently defined assets (1-N) 214, and may continuously update the trust data 222 for each of these assets, based upon the sensor inputs 201, from all the previously-described sensors, to continuously determine whether a particular asset 214 is accessible 216 or not accessible 218, based upon evaluating the trust data 222 with the trust determination algorithm 224. In some alternative embodiments, a relying party 230 may implement the policy engine 232. Further, as will be hereinafter described in more detail, trust data 222 for an asset 214 may be continuously updated based upon sensor inputs 201. Thus, policy engine 210 may continuously update the trust data 222 for a plurality of different assets to continuously determine whether an asset 214 should be accessible 216 or not accessible 218, based upon evaluating the trust data 222 with the trust determination algorithm 224.

Figure 3:
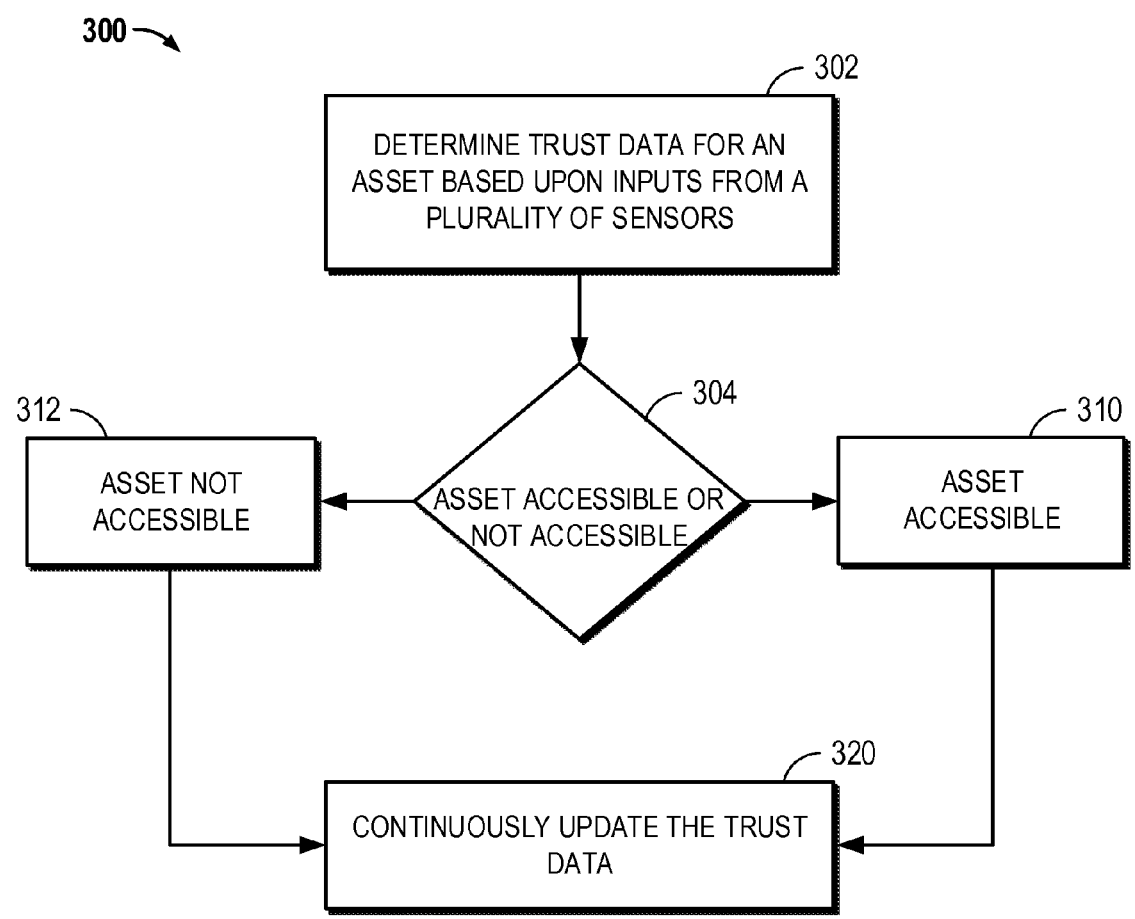
FIG. 3 is flow diagram illustrating a process to determine whether an asset is accessible or not accessible.

With brief additional reference to FIG. 3, a process 300 to determine whether an asset is accessible or not accessible is briefly described. At block 302, trust data 222 for an asset may be determined based upon inputs from a plurality of sensors. Next at decision block 304, process 300 determines whether an asset is accessible or not accessible based upon evaluating the trust data with the trust determination algorithm. If the asset is determined to be accessible, the user may access it (block 310), whereas if the asset is determined to be not accessible, the user may not access it (block 312). In either event, the trust data is continuously updated for the asset based upon the inputs from the plurality of sensors (block 320).

Referring back to FIG. 2, various examples will be hereinafter described in more detail, to provide illustrations of embodiments of the invention. In one embodiment, an asset 214 may be defined as: access to the mobile device itself; an access to local user data (e.g. files, photos, videos, etc.); voice call access; email access; access to remote data (e.g. corporate data on an enterprise server, data from a website, etc.); etc. Further, sensor inputs 201 may be data from any of the previously described sensors, such as: clock 130; proximity sensor 167; ambient light sensor 135; accelerometer 140; NFC 169; gyroscope 145; camera 170; magnetometer 150; orientation sensor 151; weather sensor 155; fingerprint sensor 152; GPS 160; IR sensor 153; microphone 165; etc. It should be appreciated that any type of sensor utilized by a mobile device may be considered as a possible sensor input. A biometric sensor may be considered to be any type of sensor that is used to identify a user based upon a user identifying biometric component (e.g., fingerprint scan, eye scan, voice scan, facial scan, etc.). Also, as previously described, contextual information may refer to the environment, at which the mobile device 100 is currently in, that does not require explicit input from the user. Therefore, a contextual sensor may be considered to be any type of sensor that relates to the current context situation of the mobile device which may relate to such sensing information as: proximity, light, acceleration, weather, orientation, GPS, etc. Thus, examples of contextual sensors include: proximity sensor 167; light sensor 135; accelerometer 140; weather sensor 155; orientation sensor 151; GPS 160, etc. These merely being examples of context situations and contextual sensors. Also, background authentication information may be characterized as data collected about the end user that does not require explicit user input thereby not intruding upon the user experience.

As previously described, processor 101 implementing policy engine 210 may select the types of sensors and sensor inputs 201 to be utilized to determine the trust data 222 for an 214 asset. In one embodiment, the trust data 222 is evaluated with the trust determination algorithm 224 to determine whether the asset 214 is accessible or not accessible. In one embodiment, the trust data 222 collected and the trust determination algorithm 224 utilized is based upon user preferences. In one embodiment, the trust data 222 collected and the trust determination algorithm 224 utilized is based upon relying party preferences. For example, the relying party 230 may utilize a policy engine 232.

Examples of how an asset 214 is determined to be accessible 216 or not accessible 218 in a background situation, will be hereinafter described. As an example, an asset 214 may become not accessible 218 under the following exemplary conditions: a particular uncharacteristic behavior is determined (e.g., uncharacteristic web pages are viewed or uncharacteristic applications that are not normally used are used); and contextual information about the mobile device has changed (e.g., the position location measured by GPS sensor 160 and accelerometer data from accelerometer sensor 160 detect that the mobile device 100 is at a completely new location (never gone to before) and the mobile device is moving at a high rate of speed (e.g., 80 mph)). As another example, an asset 214 may become not accessible 218 under the following exemplary conditions: biometric information was obtained in the background by a biometric sensor (e.g., blood pressure) or via camera 170 (e.g., camera picture of face or eye for facial or iris recognition) in the background that is not the same as the previous user or is different from the pre-stored biometric information for the user. It should be appreciated that these are merely examples and that a wide variety of different types of sensor information may be utilized. In these examples, the trust determination algorithm 224 may determine that the asset 214 is accessible 216 or not accessible 218.

As one example, a trust value or trust level may be calculated that is a computed score that combines these types of sensor information to render an integer value or a vector that may be compared to a predetermined trust value or trust level based upon user preferences or relying party preferences. As previously described, based upon this type of background information, if the trust value is greater than the predetermined trust value, then the user is allowed to have access to the asset 214 (e.g., the asset is accessible 216). However, if the trust value becomes less than the predetermined trust value, then an asset 214 may be changed from being accessible 216 to being not accessible 218.

However, even after an asset 214 has become not accessible 218, the asset 214 may become accessible again after certain conditions. Examples of these types of conditions may include: an explicit authentication by a user, such as, the user being prompted to enter a password, an explicit biometric input (e.g., a fingerprint from fingerprint sensor 152 or an iris scan or facial picture from camera 170, etc.), a voice print from microphone 165, etc.; and/or an implicit/background biometric input may be received by the sensors that identifies the user, such as camera 170 capturing an image (e.g. partial facial shot or full facial shot), a fingerprint sensing on the touch screen 120 to capture a full or partial fingerprint, etc.; and/or contextual information that is background collected may become greater than the normal/expected level—in which the contextual information may be as previously described—GPS location, accelerometer data, weather sensor data, etc. It should be noted that by utilizing implicit biometrics and contextual information that an asset may go from accessible 216, to not accessible 218, and back to accessible 216, without the user ever knowing this occurred. Of course, these are merely examples.

Figure 4:
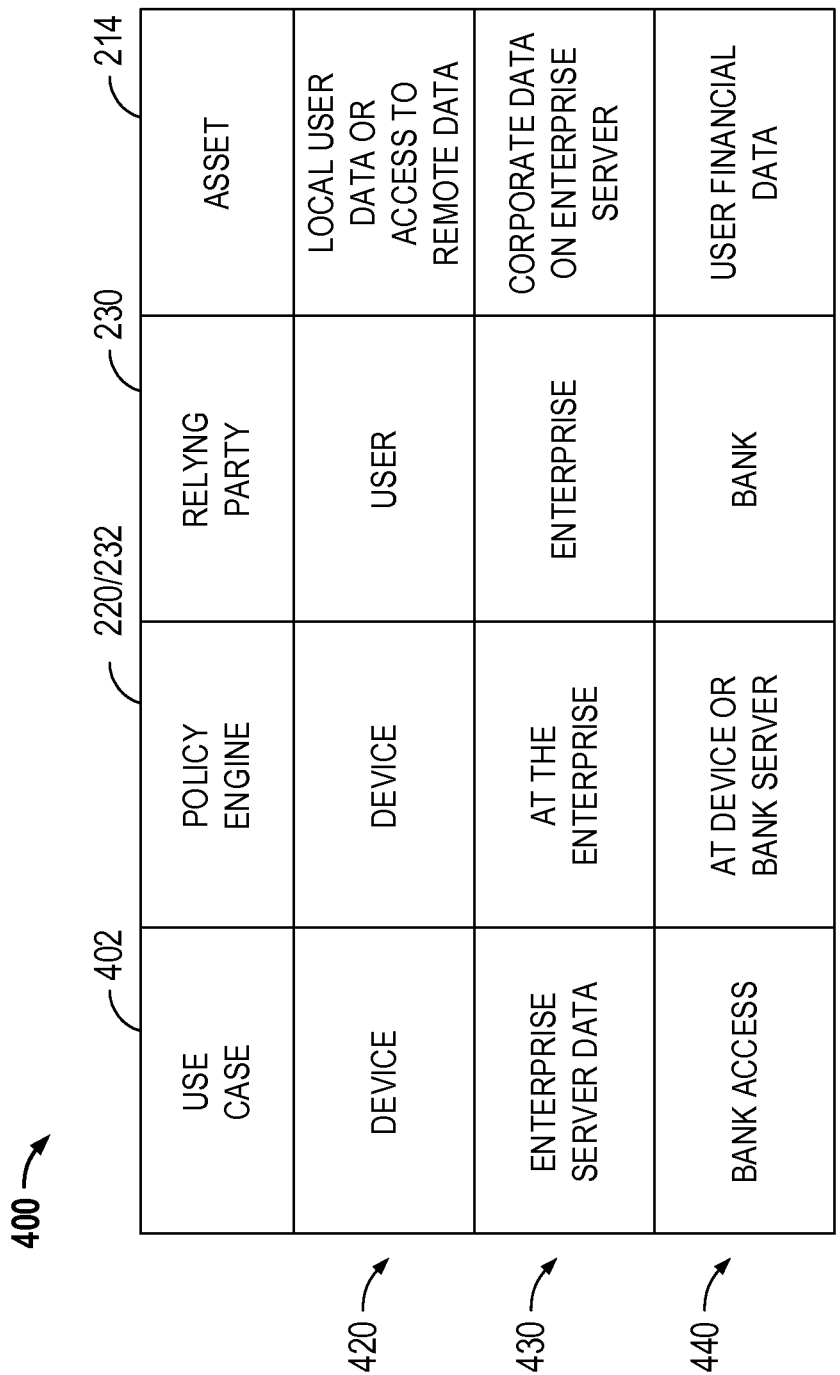
FIG. 4 is diagram illustrating a table of different examples of different use cases for different assets.

With brief additional reference to FIG. 4, different use cases may be implemented utilizing the previously described functionality. In these examples 400, different examples of different use cases 402 for different assets 214 are illustrated. In the first example 420, the use case 402 is at the mobile device 100, policy engine 220 is at the mobile device, the relying party 230 is the user, and the asset 214 is local user data at the device or access to remote data (e.g., at another device, such as a server) from the device. In this example 420, the policy engine 220 at the user device itself determines whether the asset 214 is accessible or not accessible.

As another example 430, the use case 402 may be for enterprise server data, where the policy engine 232 is at the enterprise server, the relying part 230 is the enterprise server, and the asset 214 may be corporate data on the enterprise server. In this example, the policy engine 232 at the enterprise server determines whether the asset 214 (e.g., corporate data on the enterprise server) is accessible or not accessible by the mobile device. Yet another example 440, may be remote website access (e.g., bank access) for an important remote asset (e.g., user financial data at a bank website). In this case, the policy engine 220, 232 may be at the mobile device or at the bank server. In this instance, the relying party 230 is the bank via the bank website. In this example, the policy engine whether implemented at the mobile device or the bank website may determine whether the asset 214 (e.g. users financial data) is accessible or not accessible.

It should be appreciated that these are merely examples. However, in these examples 420, 430, and 440, it should be appreciated that the policy engine 220,232, whether at the mobile device 100 or at the remote server (e.g., relying part 230), implements the functionality of: determining trust data 222 for an asset 214 based on inputs from a plurality of sensors of the mobile device 100; determining whether an asset 214 is accessible or not accessible based upon evaluating the trust data 222 with the trust determination algorithm 224; and the trust data 222 is continuously updated for the asset based upon the input from the plurality of sensors. Again, as examples, the assets may be defined as: access to the mobile device itself; an access to local user data (e.g. files, photos, videos, etc.); voice call access; email access; access to remote data (e.g. corporate data on an enterprise server, data from a website, etc.); etc.

As previously described, aspects of the invention may relate to utilizing contextual information with background authentication information. In particular, contextual information may refer to the environment, at which the mobile device 100 is currently in, and that does not require explicit input from the user. Therefore, a contextual sensor may be considered to be any type of sensor that relates to the typical context situation of the mobile device which may relate to such sensing information as: proximity, light, acceleration, weather, orientation, GPS, etc. Thus, examples of contextual sensors include: proximity sensor 167; light sensor 135; accelerometer 140; weather sensor 155; orientation sensor 151; GPS 160, etc. These merely being examples of context situations and contextual sensors. Therefore, contextual information may seek to characterize the environment of the mobile device, and the environment in which the mobile device is in, and does not seek to identify the actual user. Ambient light level, ambient light color, noise level, type of noise, type of direction of motion and temperature are types of contextual information that may be utilized. These may be determined by the ambient light sensor 135, microphone 165, accelerometer 140, gyroscope 145, weather sensor 155, or any suitable sensor device.

Background authentication information may be characterized as data collected about the end user that does not require explicit user input thereby not intruding upon the user experience. For example a facial image may be captured with camera 170 automatically without the user doing it, characteristic walking gait may be captured from accelerometer 140, or a fingerprint may be captured from a fingerprint sensor.

By continuously monitoring the contextual information, a rapid change in the contextual information may quickly lower the trust value. When his occurs, urgency occurs for the policy engine 210 to collect adequate background authentication information to authenticate the user. If the background information cannot be obtained, the asset 214 becomes not accessible 218. Explicit user input authentication may then be required. As an example, this may occur if the trust value becomes so low that it cannot be authenticated with contextual information and background information. In this case, the policy engine 210 may cause the mobile device 100 to enter into a "lock" state and the mobile device may only be unlocked by an explicit user input authentication. As an example, an explicit user input authentication to "unlock" the mobile device may occur by the mobile device 100 prompting the user to enter a password, scan a finger via a fingerprint sensor 152, or speak a voice print to be heard by microphone 165. Based upon an authorization by the policy engine 210 of the user input, the mobile device 100 may be "unlocked".

Also, in one embodiment when the trust value begins to decline, an indication may be provided to the user via the display 120 that the trust level is becoming low (which may result in locking). For example, a bar or a pie level indicator of trust strength may be displayed on the display 120. In this way, the user is notified and provided the opportunity to use an easy background authentication to increase the trust level. For example, a user may bring the camera 170 close to the user's face to increase the level or touch the touch screen display 120 instead of having to manually enter a password or manually enter a fingerprint via the fingerprint sensor 152 if the mobile device becomes locked.

In one embodiment, the processor 110 implementing policy engine 210 is configured to select the sensors utilized, select the predetermined trust value, and determine the trust data 222 to be collected, based upon power efficiency criteria 226. For example, when the trust determination algorithm calculates the asset is accessible and/or when the trust value or level is relatively high above a required predetermined value or level, policy engine 210 may only utilize sensors that require small amounts of power and that are only gathered periodically. For example, ambient light sensor 135 and accelerometer 140 may be utilized. As another example, weather sensor 155 (e.g., temperature) and ambient light sensor 135 may be utilized. Additionally, other previously explicit user actions may be checked. For example previous application launches may be checked. On the other hand, when the trust determination algorithm calculates the asset is not accessible or is approaching non-accessibility and/or the trust value drops to a lower level close to or below the required value or level, sensors that require larger amounts of power may be utilized. For example, camera 170 may be turned on in order to take a facial image and policy engine 210 may command that facial recognition be attempted. It should be appreciated that each type of sensor may have a power consumption parameter that is associated with it and that the policy engine 210 utilizing the power efficiency criteria 226 may determine which sensors to use, as well as their frequency of use, based upon their power consumption. Also, logging over time can determine which sensor input is more likely to yield a good result for a particular mobile device for a particular user and this may be factored into the power efficiency criteria 226.

As an example, as previously described, processor 110 implementing policy engine 210 may be configured to select one or more sensors with a first power consumption parameter when the trust determination algorithm calculates the asset is accessible. For example, when the trust determination algorithm calculates the asset is accessible, processor 110 implementing policy engine 210 may only utilize sensors that require small amounts of power (e.g., a first power consumption parameter). Conversely, when the trust determination algorithm calculates the asset is not accessible or is approaching non-accessibility and/or the trust value drops to a lower level close to or below the required value or level, processor 110 implementing policy engine 210 may be configured to select one or more sensors with a second power consumption parameter that is higher than the first power consumption parameter. As previously described, sensors that require larger amounts of power may be utilized. For example, as previously described, camera 170 may be turned on in order to take a facial image and policy engine 210 may command that facial recognition be attempted.

Figure 5:
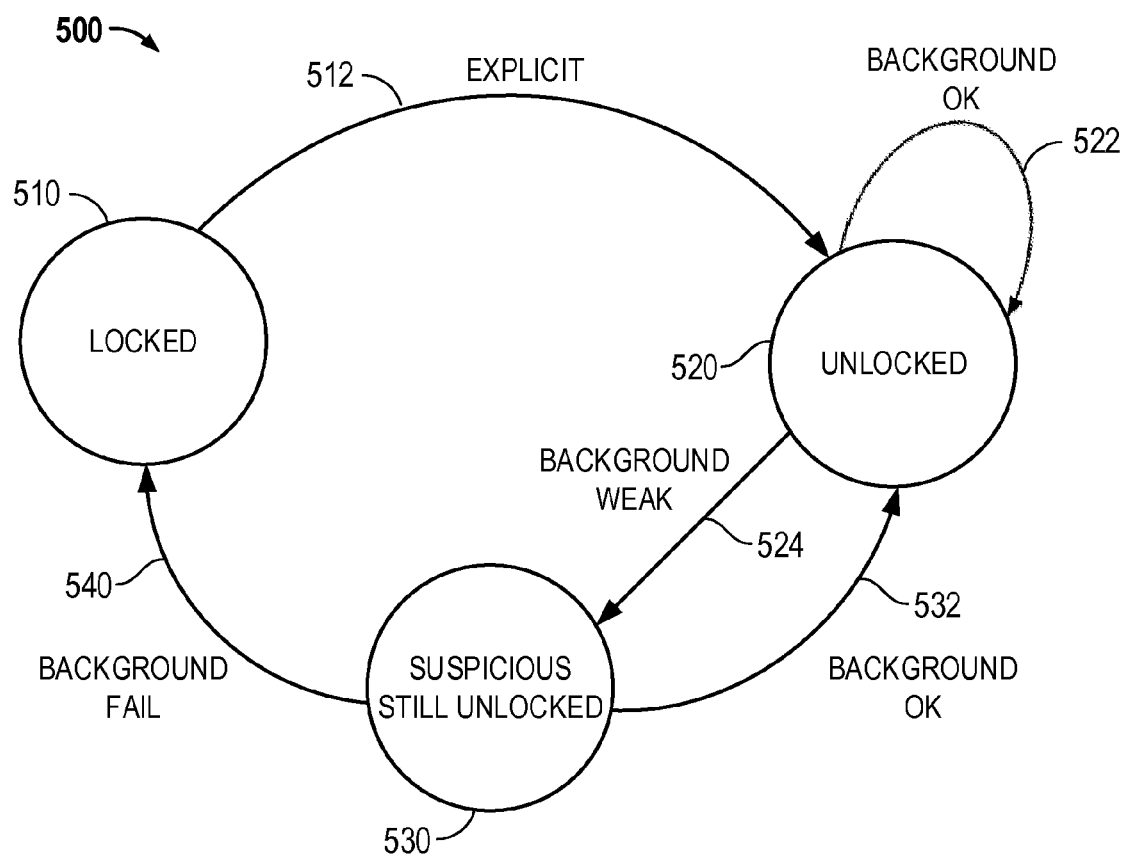

With additional reference to FIG. 5, different states 500 for assets of the mobile device are shown. In one embodiment, policy engine 210 may be configured to place or maintain an accessible asset 214 in an unlocked state 520 in which the trust determination algorithm 224 determines an asset is accessible. In the unlocked state 520, the trust data 222 is collected based upon inputs from sensors that do not require explicit user input (e.g., background information—including contextual information, as previously described). In this state, background information is monitored (line 522), such that the trust data is determined based only upon non-explicit user input (e.g., background information including contextual information). As previously described, such background information may include: fingerprint information from touching the screen, face and iris information from the camera (without the user implementing it), and other types of background information. Background information may also include contextual information, as previously described, such as: light information, weather information, position information, location information, movement information (e.g., sitting, walking, running, car, train, etc.). Also other types of contextual information such as a change in the phone environment may be utilized. In the unlocked stated 520, in which background information (line 522) is monitored, the mobile device remains unlocked.

Further, policy engine 210 may be configured to place or maintain the currently accessible asset 214 into a suspicious state based upon diminished trust data 222. For example, the trust determination algorithm 224 may determine that a suspicious state should be entered. In a particular example, it may be determined that a trust value below a predetermined desired trust value has occurred. The suspicious state 530 is still unlocked. Typically, the suspicious state 530 is reached when the monitored background information has become weak (e.g., line 524). The mobile device may be returned to the unlocked state 520 in two possible ways. An explicit user input may be entered by the user and received by the policy engine (e.g. a password entered via the user interface 119, a fingerprint via the fingerprint sensor 152, a user implemented facial recognition via camera 170, etc.), or, the unlocked state 520 may be returned to based upon an increase in the trust value without user input—but by the background information 530 becoming sufficient enough to increase the trust value to a suitable level (Background OK (line 532)). The different types of background information to return the mobile device back to the unlocked state 520, have been previously described in detail.

However, in some embodiments, the policy engine 210 may be configured to place the accessible asset 214 into a locked state 510 based upon significantly diminished trust data 222 as determined with the trust determination algorithm 224 (denoted as Background Fail, line 540), in which case, the asset enters into the locked state 510. The policy engine may be configured to return the asset from the locked state 510 to the unlocked state 520, once again, based upon explicit user input. Explicit user inputs have been previously described in detail.

Additional information regarding the locked state 510, the unlocked state 520, and the suspicious state 530, will be hereinafter described. For explicit user authentication (line 512), it should be noted that explicit user authentication should clearly identify the user. The mobile device is typically locked until the explicit user authentication is accepted by the policy engine 210. Explicit user authentication may include user entries related to: explicit user PIN entry, password entry, fingerprint entry, iris entry, patterned entry on a touch screen, as well as others. It should be appreciated that the authentication criteria may be based both upon user preferences and/or relying party preferences such that explicit authentication is definable.

As far as background authentication (e.g. background lines 522, 524, 532, 540), the user may be continuously authenticated with background information (even in a weak state) and the trust determination algorithm 224 may continuously ensure that a suitable trust value is maintained to keep the asset unlocked (520 and 530). However, in some circumstances, the background information may not be enough to keep the trust value larger than the predetermined trust value and the asset may become locked (510).

Many types of sensor inputs may be checked in the background without requiring user inputs. Examples of these include capturing a user's fingerprint from fingerprint sensor technology embedded in the touch screen of the display device (e.g., user interface 119, display 120, etc.) during normal use; capturing facial or iris recognition via the camera 170; capturing voice data via the microphone 165; capturing biometric sensor data heartbeat, blood pressure, etc.; collecting data about applications used; collecting data via typing cadence; etc. Other types of partial background authentication may include a partial fingerprint data collection and/or small samples of speech collection from these sensors. As has been previously described, these types of background authentication information may be composited in a scoring system that is then utilized by the trust determining algorithm and/or to calculate trust values.

Other types of background information that does not identify the user but may be utilized for background information may include such data as: position and rate of travel; location; type of motion (still, walking, running, car, train, etc.); temperature; humidity; light level; noise level; familiar voices (e.g. not owner's); accessible Wi-Fi applications; etc. It should be appreciated that the previous sensors described: GPS 160; accelerometer 140; GPS 160; gyroscope 145; weather sensor 155; light sensor 135; microphone 165; etc. may be utilized to collect this information.

It should be noted that, in the unlocked state 520, background information may only need to be obtained periodically. However, if the background authentication gets a very clear/strong biometric that is attributed to somebody else, then the background information fails and the mobile device automatically goes to the locked state 510. For example, if the touch screen display 120 suddenly captures a very clear fingerprint that is not recognized to belong to the user, the locked state 510 may be entered automatically. However if the background information merely weakens (line 524), then the mobile device may enter the suspicious state 530. In the suspicious state 530, an indicator may be displayed on the display (e.g., a status bar icon) so that the user knows that a suspicious state has been entered and the mobile device may lock soon. Based upon this, a user may be encouraged to touch the touch screen display 120 or a dedicated fingerprint sensor to provide a fingerprint, or to look into camera 170 for a facial recognition or iris recognition process, to ensure quick authentication out of the suspicious state 530. This of course is easier for the user than getting out of a locked state 510 (e.g., the device is locked) and these types of facial and finger recognition do not have to be of such high quality as would be typically used to get out of a locked state 510 scenario.

In some embodiments, each periodic background authentication and each environmental check may be saved. In this way, new background authentications and environmental checks may be compared to previous ones. In other embodiments, inactivity may be detected when there is no user input, no change in device environment, darkness from being in a purse or pocket, etc. Inactivity may make the allowable time between background checks significantly longer. The mobile device may lock the user interface against inadvertent input but may not go until a full lock state 210 from inactivity. For example, a simple swipe may bring the mobile device out of inactivity. Further, a user may perform a user interface lock manually before putting the device away. This may avoid the fully locked state 510 while the mobile device is in user's pocket or purse. The last state may also be recorded across boot cycles.

In one embodiment, a black box mode may be entered after the mobile device has gone into the locked state 510. In this embodiment, when the mobile device goes into the locked state, particular parameters may be recorded that are useful in finding the device or what happened to the device. Such parameters may include: fingerprints; photos; video; audio; environmental conditions; etc. This information may be stored locally and checked when the mobile device is recovered. Further, this information may be transmitted to a server.

Also, as previously described, both user preferences and/or relying party preferences may be utilized in determining the types of trust data 222 to be collected and/or the trust determination algorithm 224 to be utilized. Further, many of the previously described sensor inputs 201 may be selected based upon the user and relying party preferences. Examples of the user and/or relying party preferences may include: unlocking/locking the mobile device based upon authentication criteria entries (e.g., password, fingerprint, voice, etc.); locking the mobile device based upon timeout durations; timing between background confirmations (e.g., x seconds, 1 minute, 5 minutes, 10 minutes, etc.); types of active background confirmation methods (e.g., face, touch-screen finger, iris, voice, etc.); and sensitivity to environmental changes (high, medium, low; etc.). In particular, this allows for enterprise preferences (e.g. relying party preferences) to set up minimum configurations. Further, in some examples, after an asset is determined to be not accessible, e.g., after a lock timeout period, a sensor of the plurality of sensors may initiate an authentication process. As an example, if a mobile device has been placed down by a user, and the mobile device is then picked up 2 minutes later (and the device lock timeout is greater than 2 minutes), then that event identified by a sensor (e.g., measured by an accelerometer sensor) may turn on a camera sensor or another type of sensor to authenticate the user.

As previously described, trust data 222 may be calculated for each asset 214, and, whether or not that particular asset is accessible or not accessible, is determined with the trust determination algorithm 224. However, in some embodiments, the mobile device may be configured with a global trust value for all assets that may be utilized with the trust determination algorithm. In this scenario, each asset specifies the level that it considers strong enough to enable access versus the global trust value. For example, the global trust value range may be: 0-100. As an example, assets could set trust values as follows: company confidential information could require at least 80; the address book could require 60; access to stored photos 40; and the ability to take a picture 20. It should be appreciated that these are merely examples. In this exemplary configuration, there could be a system API that an application would call to find the current trust data. Each application would call the API and decide whether an asset could be assessed on its own. Further, another type of system may have separate trust values for: 1) user data; 2) enterprise control data; 3) entertainment related assets; and 4) email related assets. This is just one example of different trust values for different types of asset. Of course, the specific assets could elect to compute their own trust value. It should be appreciated that a wide variety of different types of asset divisions and trust value divisions may be utilized and implemented with embodiments of the invention.

Additionally, it should be appreciated that the type of mobile device and/or non-mobile computing device that provides enhanced security by continuously monitoring whether the correct user is accessing an asset by evaluating trust data with a trust determination algorithm may have multiple-user implementations. For example, parental controls may implemented by evaluating the trust data. As one example, only a father may be authenticated to access enterprise assets. As another example, only a mother may be authenticated to visit certain predefined websites. As yet another example, only particular children may be authenticated to play certain types of games. This may apply to any type of computing device, such as, tablet computers that are shared.

It should be appreciated that aspects of the invention previously described may be implemented in conjunction with the execution of instructions by one or more processors of the device, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the devices are mobile or wireless devices, they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet computer, a mobile computer, a laptop computer, an entertainment device (e.g., a music or video device), a headset (e.g., headphones, an earpiece, etc.), a medical device (e.g., a biometric sensor, a heart rate monitor, a pedometer, an ECG device, etc.), a user I/O device, a computer, a wired computer, a fixed computer, a desktop computer, a server, a point-of-sale device, a set-top box, or any other suitable device. These devices may have different power and data requirements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
a plurality of sensors; and
a processor configured to:
determine trust data for an asset based upon inputs from the plurality of sensors;
determine whether an asset is accessible or not accessible based upon evaluating the trust data with a trust determination algorithm;
continuously update the trust data to continue to allow access to the asset or revoke access to the asset based upon the inputs from the plurality of sensors; and
select for utilization one or more sensors from the plurality of sensors with a first power consumption parameter associated with background information when the trust determination algorithm calculates the asset is accessible and an unlocked or suspicious state is maintained or one or more sensors from the plurality of sensors with a second power consumption parameter associated with user input when the trust determination algorithm calculates the asset is not accessible and a locked state is entered.

2. The mobile device of claim 1, wherein the trust determination algorithm calculates whether the asset is accessible or not accessible.

3. The mobile device of claim 1, wherein the asset includes at least one of access to the mobile device itself, local user data, voice call access, email access, or access to remote data.

4. The mobile device of claim 1, wherein the trust data collected and the trust determination algorithm utilized is based upon user preferences or preferences assigned to the mobile device by a management authority.

5. The mobile device of claim 1, wherein the trust data collected is based upon relying party preferences.

6. The mobile device of claim 1, wherein the processor is further configured to assign the accessible asset into the unlocked state, wherein the trust data collected is based upon inputs from a plurality of sensors.

7. The mobile device of claim 6, wherein the processor is further configured to assign the accessible asset into the suspicious state based upon the trust determining algorithm determining the suspicious state, wherein a received explicit user input is usable to return the accessible asset to the unlocked state.

8. The mobile device of claim 6, wherein the processor is further configured to assign the accessible asset into the locked state.

9. The mobile device of claim 8, wherein the processor is further configured to return the accessible asset from the locked state to the unlocked state based upon received explicit user input.

10. The mobile device of claim 1, wherein after an asset is determined to be not accessible, a sensor of the plurality of sensors initiates an authentication process.

11. A method comprising:
determining trust data for an asset based upon inputs from a plurality of sensors;
determining whether an asset is accessible or not accessible based upon evaluating the trust data with a trust determination algorithm;
continuously updating the trust data to continue to allow access to the asset or revoke access to the asset based upon the inputs from the plurality of sensors; and
selecting for utilization one or more sensors from the plurality of sensors with a first power consumption parameter associated with background information when the trust determination algorithm calculates the asset is accessible and an unlocked or suspicious state is maintained or one or more sensors from the plurality of sensors with a second power consumption parameter associated with user input when the trust determination algorithm calculates the asset is not accessible and a locked state is entered.

12. The method of claim 11, wherein the trust determination algorithm calculates whether the asset is accessible or not accessible.

13. The method of claim 11, wherein the asset includes at least one of access to a mobile device itself, local user data, voice call access, email access, or access to remote data.

14. The method of claim 11, wherein the trust data collected and the trust determination algorithm utilized is based upon user preferences or preferences assigned to a mobile device by a management authority.

15. The method of claim 11, wherein the trust data collected is based upon relying party preferences.

16. The method of claim 11, further comprising assigning the accessible asset into an the unlocked state, wherein the trust data collected is based upon inputs from a plurality of sensors.

17. The method of claim 16, further comprising assigning the accessible asset into the suspicious state based upon the trust determining algorithm determining the suspicious state, wherein a received explicit user input is usable to return the accessible asset to the unlocked state.

18. The method of claim 16, further comprising assigning the accessible asset into the locked state.

19. The method of claim 18, further comprising returning the accessible asset from the locked state to the unlocked state based upon received explicit user input.

20. A non-transitory computer-readable medium comprising code which, when executed by a processor, causes the processor of a computing device to perform operations comprising:
   determining trust data for an asset based upon inputs from a plurality of sensors;
   determining whether an asset is accessible or not accessible based upon evaluating the trust data with a trust determination algorithm;
   continuously updating the trust data to continue to allow access to the asset or revoke access to the asset based upon the inputs from the plurality of sensors; and
   selecting for utilization one or more sensors from the plurality of sensors with a first power consumption parameter associated with background information when the trust determination algorithm calculates the asset is accessible and an unlocked or suspicious state is maintained or one or more sensors from the plurality of sensors with a second power consumption parameter associated with user input when the trust determination algorithm calculates the asset is not accessible and a locked state is entered.

21. The non-transitory computer-readable medium of claim 20, wherein the trust determination algorithm calculates whether the asset is accessible or not accessible.

22. The non-transitory computer-readable medium of claim 20, wherein the asset includes at least one of access to the computing device itself, local user data, voice call access, email access, or access to remote data.

23. A mobile device comprising:
   means for determining trust data for an asset based upon inputs from a plurality of sensors;
   means for determining whether an asset is accessible or not accessible based upon evaluating the trust data with a trust determination algorithm;
   means for continuously updating the trust data to continue to allow access to the asset or revoke access to the asset based upon the inputs from the plurality of sensors; and
   means for selecting for utilization one or more sensors from the plurality of sensors with a first power consumption parameter associated with background information when the trust determination algorithm calculates the asset is accessible and an unlocked or suspicious state is maintained or one or more sensors from the plurality of sensors with a second power consumption parameter associated with user input when the trust determination algorithm calculates the asset is not accessible and a locked state is entered.

24. The mobile device of claim 23, wherein the trust determination algorithm calculates whether the asset is accessible or not accessible.

25. The mobile device of claim 23, wherein the asset includes at least one of access to the mobile device itself, local user data, voice call access, email access, or access to remote data.

* * * * *